July 22, 1958   J. R. OISHEI   2,844,102
WINDSHIELD WASHER
Original Filed July 3, 1952
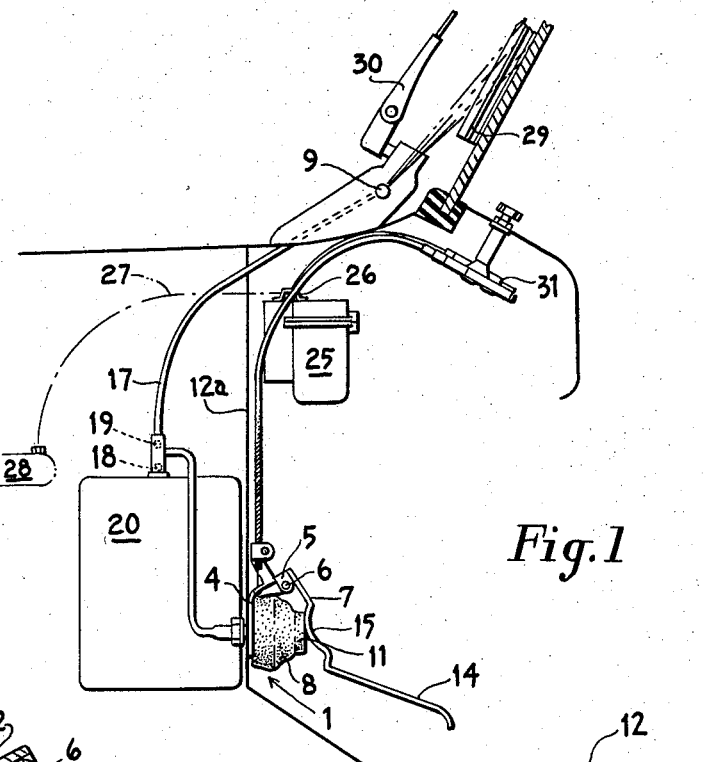
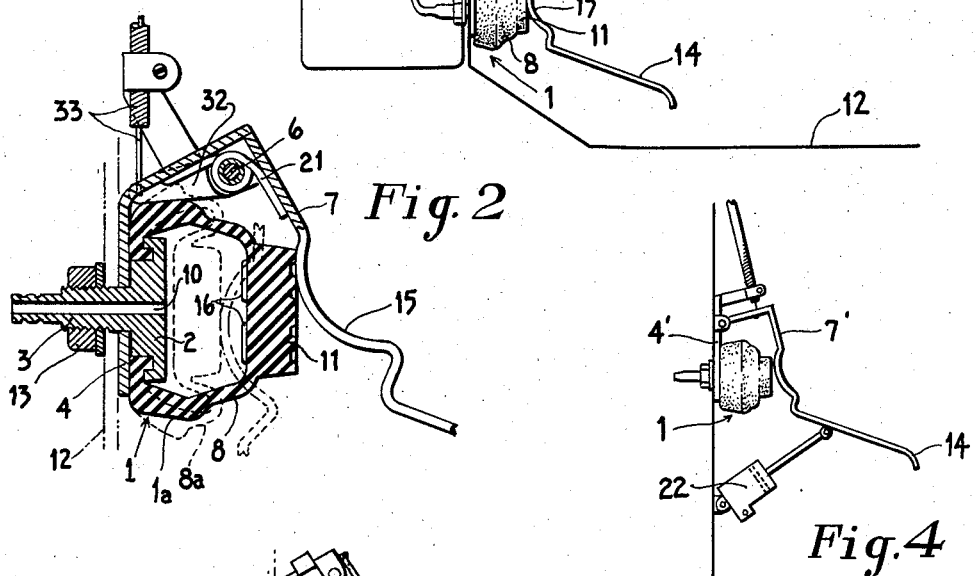
INVENTOR.
John R. Oishei
BY
Bean Brooks Buckley & Bean
ATTORNEYS

United States Patent Office 2,844,102
Patented July 22, 1958

2,844,102

WINDSHIELD WASHER

John R. Oishei, Buffalo, N. Y., assignor to Trico Products Corporation, Buffalo, N. Y.

Original application July 3, 1952, Serial No. 297,007, now Patent No. 2,743,473, dated May 1, 1956. Divided and this application November 3, 1955, Serial No. 544,642

1 Claim. (Cl. 103—148)

This invention relates to a windshield washer for applying a liquid solvent onto the surface of the windshield for wetting the same to soften congealed and other vision obscuring matter thereon toward facilitating its removal from the field of vision. The wetting of the surface is primarily intended for use with a windshield cleaner by which the surface is given a scrubbing action in the presence of the liquid solvent. It has heretofore been proposed to wet the windshield surface by means of a floor-mounted pump having an upstanding plunger stem to directly receive the foot pressure of the motorist for ejecting the liquid solvent onto such surface. Because the solvent is an incompressible fluid, considerable effort on the part of the motorist is required to depress the plunger, especially from his position in the usual deeply cushioned vehicle seat. Toe pressure alone is too light to satisfactorily squirt an ample volume onto the windshield without changing his position to bear down more heavily upon the plunger.

The primary object of the present invention is to provide a washer pump of this general type incorporating means by which the manual effort is magnified to facilitate the discharge of the solvent and to readily control its application to the surface. From one aspect, the invention resides in a washer pump having a force multiplying arrangement by which sufficient hydrostatic pressure may rapidly be obtained to insure the delivery of the solvent onto the glass against wind pressure encountered in the forward motion of the vehicle. From another aspect, the invention has for its aim to provide a simple washer construction capable of effecting a sustained or prolonged delivery of the washing liquid onto the windshield by a quick initial or presetting operation that is accomplished manually; this term being used herein as comprehending foot actuation also.

More particularly, the invention utilizes a foot actuated lever capable of toe-pressure operation for building up the required hydrostatic pressure to properly deliver and apply the liquid solvent to the windshield against contrary wind currents. An important factor of the lever actuator herein is the ability of the user to control and sustain the delivery of the water to the windshield by uniform foot pressure throughout the water delivering cycle. Without the lever it becomes a relatively more difficult task to modulate and control the liquid discharge by either relaxing or intensifying the foot pressure during the fluid delivery cycle. Maintenance of the water delivery onto the glass is assured with the lever by reason of the mechanical advantage afforded thereby and enables the motorist to readily regulate the intensity of the solvent spray while conserving the liquid supply. The foot may pivot on the floor for steadiness in applying the toe pressure to the actuator.

A further object of the invention is to provide a washer in which the liquid displacing member automatically adjusts itself to an overlying swingable actuator to more effectively eject the liquid content for greater efficiency, the construction embodying simplicity and economy in its design with a minimum number of parts.

The foregoing and other objects will manifest themselves as this description progresses, reference being made therein to the accompanying drawing, wherein—

Fig. 1 is a schematic view showing the washer unit of the present invention mounted on a motor vehicle;

Fig. 2 is a sectional view through the washer unit;

Fig. 3 is a side elevation of a modified embodiment having latch means for holding the pedal depressed; and Fig. 4 is a side view of a further modification.

Referring more particularly to the drawings, a pump of special design is employed to intake liquid solvent from a reservoir and discharge it under a suitable hydrostatic pressure that is controllably developed through a mechanism which facilitates the pump actuation and magnifies a manually applied effort to the greatest advantage in the use and conservation of the solvent. For this purpose, the pump is depicted herein as a bellows 1 made of rubber or other resilient material and having a chamber open at its bottom side to receive an anchoring head 2 of a tubular mounting shank 3. The shank penetrates a bracket 4 in the form of a body plate having a central opening for the purpose. This body plate has a pair of marginal ears 5 extending therefrom to support, by means of a pivot pin 6, a lever member 7 of sufficient length to secure approximately a two-to-one mechanical advantage, or other desired leverage, thereby to enable a forceful compression of the bellows and the creation of a hydrostatic pressure sufficient to distend the side wall 8. By this arrangement, the bellows seats upon the body plate, being interposed between the latter and the overlying lever and providing a compact washer unit which may readily be mounted and demounted.

The foot lever may be quickly depressed and when this is done the side wall 8 will yield under a predetermined hydrostatic pressure and distend, somewhat as indicated at 8a by the broken lines in Fig. 2, thereby to convert the bellows into a spring motor for maintaining the pressure to continue the liquid displacement through a connected nozzle 9 until the rubber spring has spent itself. This side wall distention serves a dual purpose, first, to predetermine the maximum hydrostatic pressure and thereby control the force of the delivered jet or spray and, second, to store up energy for subsequent expenditure in continuing the jet for a time interval after the lever 7 has been depressed to its fullest extent. The discharge of the liquid solvent onto the windshield through the restricted duct 10 of the mounting shank 3 will deliver a jet at the desired pressure and until the distended wall returns to its normal state, unless the delivery be terminated sooner by relieving the foot pressure on the lever 7.

The central area of the top diaphragm portion of the bellows is thickened to provide in nature a liquid displacing plunger 11 which is yieldably supported by the distensible wall 8 from and above the reinforced cupped chamber 1a. When depressed, the plunger 11 will enter the pump chamber 1a and as it does will cause the wall 8 to follow inwardly, rolling as it does, for increasing the effective liquid displacement of the plunger.

The bracket, the bellows and the lever constitute the washer unit which is mounted on the vehicle by inserting the shank 3 through a single opening in the floor 12, or in the firewall extension 12a thereof, and securing it in a suitable manner, as by a clamp nut 13. Consequently, the mounting shank constitutes the sole means for mounting the washer unit. The lever 7 extends across the body plate 4 and downwardly in the form of a toe-rest 14 to receive the pressure from the toe portion of the foot. The lever has a balled part 15 bearing upon the plunger 11 to depress it into the bellows chamber and down upon the anchoring head 2. To avoid closing off the outlet duct 10 the under face of the plunger may be formed with clearance ribs 16 between which the liquid within the expanded bellows will find its way to the duct 10 and out through the connecting conduit 17 to the nozzle 9. Suitably placed inlet and outlet valves 18 and 19 provide for unidirectional flow from the reservoir 20 to the nozzle.

In use, the pedal serves as the control for the pump and by it the plunger 11 may be depressed either slowly to have a foot-regulated jet or rapidly to cause the distensible wall portion 8 to bulge under the hydrostatic pressure to provide a jet of predetermined maximum intensity. This action will cause the liquid to escape through the restricted nozzle passage and onto the windshield either in accordance with variations in the foot pressure or under the motive power of the distended rubber wall for the time interval determined by the restoration of such side wall to its normal though collapsed state, unless the motive power is sooner interrupted by relieving the foot power. During the depression of the foot lever, the balled part 15 will slide across the face of the plunger 11, as depicted in Fig. 2, causing the plunger to rock on its flexible supporting wall 8 and automatically adjust itself to the contacting part of the lever to the best advantage. With the foot pressure removed, the foot lever will return to its normally elevated position under the urge of the bellows and the assistance of an applied spring pressure. To this end a spring 21 is coiled about the pivot pin 6 and arranged to yieldably hold the lever elevated.

The motorist may be relieved from holding the foot lever depressed by providing a time-delay unit, such as a dash pot 22, as shown in Fig. 4, wherein the lever 7' and its mounting bracket 4' are differently shaped but otherwise similar to their corresponding parts in Fig. 2. This retarding means will prolong the jetting of the solvent onto the windshield after the removal of the foot pressure and also will automatically terminate the jet. Other holdover means may be provided, such as the latch 23, Fig. 3, which is designed to engage the foot lever 7" when depressed to hold it until the latch is disengaged by the foot against the urge of its spring 24.

The time-delay or holdover means are also useful, when the pump is coordinated with a windshield wiper, to continue the wiping action for a period following the solvent application. Fig. 1 shows such a coordinated arrangement wherein a windshield cleaner motor 25 has its control valve 26 interposed in the suction line 27 leading from the intake manifold 28. The motor is operatively connected to the wiper 29 by a suitable transmission (not shown) acting through the wiper arm 30. To coordinate the two controls 7 and 26 for joint operation of the windshield cleaner unit and the washer unit, there is interposed a coordinating unit 31 which operatively connects the washer unit 1, 4, 7 to the cleaner unit 25, 30 to compel wiper performance whenever the washer is actuated by the foot lever. By this coordination, the wiper will scrub the windshield surface during the application of the liquid and thereafter will continue to operate alone for the prescribed interval to dry the surface. The coordinator also embodies a disconnect feature which enables the wiper to be operated independently of the washer during rainy weather, this feature along with the coordinator being more fully described and claimed in the above referred to parent disclosure. For carrying out this coordination, the lever 7 has an arm 32 connected to a Bowden cable 33 to the coordinator unit to actuate the latter.

The pump unit is mounted and demounted as an entity. Its action may readily be controlled by toe pressure while the operator's foot rests for steady support on the floor of the vehicle and pivots upon the heel. The force multiplying lever insures a positive and forceful jet capable of withstanding contrary wind currents, an effective jet from little manual effort. The pump construction is simple and of economic manufacture and its operation is efficient in maintaining a clear field of vision for the motorist, and while the foregoing description has been given in detail, it is without thought of limitation since the inventive principles are capable of assuming other physical embodiments without departing from the spirit of the invention and the scope of the appended claim.

This application is a division of my parent case Serial Number 297,007 filed July 3, 1952, now Patent Number 2,743,473 issued May 1, 1956.

What is claimed is:

A pump unit comprising a mounting bracket in the form of a body plate having a central opening and a pair of marginal ears, an anchoring member secured to the pump and having a tubular shank passing through the central opening of the plate, a clamping member threaded onto the shank for anchoring the pump to the body of a motor vehicle, a lever pivoted at one end between the said ears and extending over and beyond the body plate to provide a toe-rest on its opposite end, the pump being seated upon the body plate beneath the lever and having a chamber, and a fluid displacing wall operatively engaged by the lever to be actuated thereby.

References Cited in the file of this patent

UNITED STATES PATENTS

| | | |
|---|---|---|
| 1,091,566 | Eimer | Mar. 31, 1914 |
| 2,651,454 | Bjurstrom | Sept. 8, 1953 |
| 2,717,556 | Bartoo | Sept. 15, 1955 |